(12) United States Patent
Kaneda et al.

(10) Patent No.: US 8,666,697 B2
(45) Date of Patent: Mar. 4, 2014

(54) LIGHT CONDENSING LENS AND THREE-DIMENSIONAL DISTANCE MEASURING APPARATUS

(71) Applicant: Sony Corporation, Tokyo (JP)

(72) Inventors: Kazumasa Kaneda, Kanagawa (JP); Yoshito Asoma, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/857,743

(22) Filed: Apr. 5, 2013

(65) Prior Publication Data

US 2013/0223075 A1    Aug. 29, 2013

Related U.S. Application Data

(63) Continuation of application No. 12/917,006, filed on Nov. 1, 2010.

(30) Foreign Application Priority Data

Nov. 9, 2009  (JP) ................................. 2009-256053

(51) Int. Cl.
*G01B 11/14* (2006.01)
*G01C 3/08* (2006.01)

(52) U.S. Cl.
USPC ............................ 702/159; 356/614; 359/749

(58) Field of Classification Search
USPC .......... 702/149, 158, 159, 172, 173; 359/671, 359/749; 356/614; 366/268; 250/201.3
See application file for complete search history.

(56) References Cited

U.S. PATENT DOCUMENTS

| | | | | |
|---|---|---|---|---|
| 4,918,583 A | * | 4/1990 | Kudo et al. | ................... 366/268 |
| 6,043,475 A | * | 3/2000 | Shimada et al. | ........... 250/201.3 |
| 7,136,153 B2 | | 11/2006 | Mori et al. | |
| 7,403,269 B2 | | 7/2008 | Yamashita et al. | |
| 2007/0133107 A1 | | 6/2007 | Ohzawa et al. | |
| 2008/0266576 A1 | | 10/2008 | Iwamoto | |

FOREIGN PATENT DOCUMENTS

| | | |
|---|---|---|
| JP | 61-260178 | 11/1986 |
| JP | 05-288525 | 11/1993 |
| JP | 07-098379 | 4/1995 |
| JP | 07-270602 | 10/1995 |
| JP | 11-194018 | 7/1999 |
| JP | 2000-147124 | 5/2000 |
| JP | 2000-180759 | 6/2000 |
| JP | 2004-138383 | 5/2004 |
| JP | 3875665 | 11/2006 |
| JP | 3908226 | 1/2007 |
| JP | 4059911 | 12/2007 |
| JP | 2009-162659 | 7/2009 |

OTHER PUBLICATIONS

Japanese Office Action issued in connection with related Japanese Patent Application No. 2009-256053 dated Oct. 1, 2013.

* cited by examiner

*Primary Examiner* — John H Le
(74) *Attorney, Agent, or Firm* — Dentons US LLP

(57) ABSTRACT

A light directing system including first and second relay lenses through which light passes, the first and second relay lenses being positioned at conjugate positions, the first relay lens being positioned between the second relay lens and a light source, a focal length of the first relay lens being longer than a focal length of the second relay lens.

24 Claims, 13 Drawing Sheets

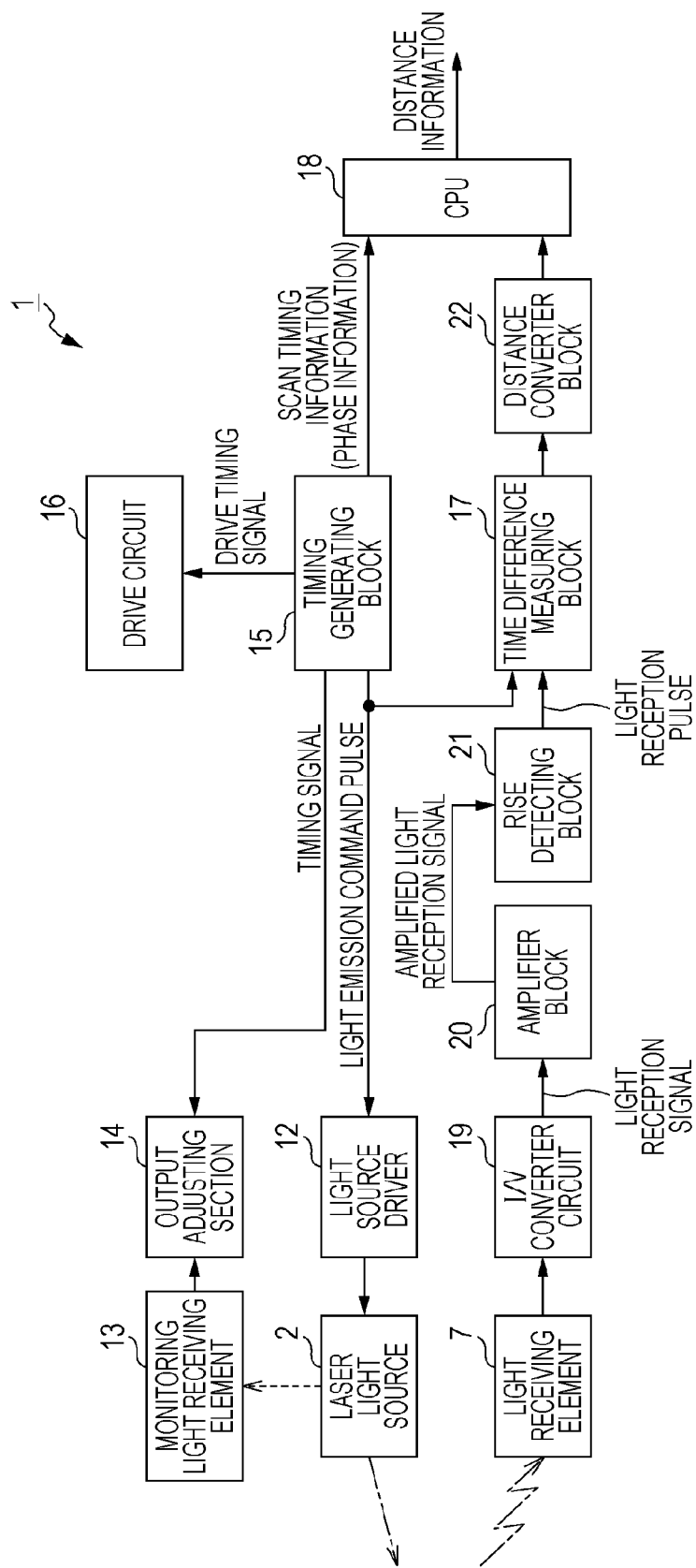

LIGHT CONDENSING LENS AND THREE-DIMENSIONAL DISTANCE MEASURING APPARATUS

RELATED APPLICATION DATA

This application is a continuation of U.S. patent application Ser. No. 12/917,006 filed Nov. 1, 2010, the entirety of which is incorporated herein by reference to the extent permitted by law. The present application claims the benefit of priority to Japanese Patent Application No. JP 2009-256053 filed on Nov. 9, 2009 in the Japan Patent Office, the entirety of which is incorporated by reference herein to the extent permitted by law.

BACKGROUND OF THE INVENTION

1. Field of the Invention

The present invention relates to the technical field of light condensing lenses and three-dimensional distance measuring apparatuses. More particularly, the present invention relates to the technical field of light condensing lenses for condensing laser light on a light receiving element including a plurality of lenses disposed side by side in a splitting direction of a view angle to secure a sufficient amount of light received by the light receiving element and to reduce the light receiving area of the light receiving element.

2. Description of the Related Art

There are some distance measuring apparatuses that measure the distance to an object to be measured using laser light as measurement light.

Examples of such distance measuring apparatuses include an apparatus that modulates laser light and irradiates an object to be measured with the modulated laser light to measure a distance by detecting the phase difference between the light emitted from a laser light source toward the object to be measured and the light incident on a light receiving element after being reflected by the object to be measured.

Other examples include a distance measuring apparatus that emits a laser pulse to an object to be measured to measure a distance by measuring the round-trip period of the laser pulse from the emission from a laser light source to the incidence on a light receiving element after the laser pulse is reflected by the object to be measured.

The distance measuring apparatuses described above may be, for example, incorporated in an industrial robot to measure the distance from the robot to an object to be measured provided around the robot, incorporated in a vehicle to measure the distance between vehicles, and so forth. The distance measuring apparatuses may also be incorporated in a gaming device to measure the distance from a predetermined position to a user as an object to be measured.

In some distance measuring apparatuses, a light projecting mirror is turned in a predetermined direction to linearly scan an object to be measured with laser light reflected by the light projecting mirror in order to measure a two-dimensional distance (see Japanese Patent No. 3908226, Japanese Patent No. 3875665, and Japanese Unexamined Patent Application Publication No. 2009-162659, for example).

In other distance measuring apparatuses, the entire apparatus is turned about a turning axis that is different from the turning axis of a light projecting mirror, or a group of prisms is turned to expand a scanning region for an object to be measured in order to measure a three-dimensional distance (see Japanese Patent No. 4059911 and Japanese Unexamined Patent Application Publication No. 07-98379, for example).

In still other distance measuring apparatuses, scanning is repeatedly performed with laser light using a galvano mirror or a MEMS (Micro Electro Mechanical Systems) mirror as a light projecting mirror to measure a two-dimensional or three-dimensional distance.

SUMMARY OF THE INVENTION

In the three-dimensional distance measuring apparatuses described above, it is necessary to acquire distance information on an object to be measured over a certain range of view angle.

Examples of such three-dimensional distance measuring apparatuses that acquire distance information on an object to be measured over a certain range of view angle include an apparatus in which laser light for the entire range of view angle is condensed using a wide-angle short-focus lens to cause the laser light to be incident on a light receiving element.

Even if a wide-angle short-focus lens is used, however, the numerical aperture of the lens is limited, and therefore the image height may be very large depending on the magnitude of the view angle, which may make it difficult to effectively condense light on the light receiving element.

Accordingly, a plurality of wide-angle short-focus lenses may be used to cover respective split portions of the view angle so that each of the lenses covers a reduced portion of a view angle for the number of the lenses used. Because the wide-angle short-focus lenses have a large numerical aperture, however, it may be difficult to provide a light receiving element that is common among the plurality of wide-angle short-focus lenses.

In the three-dimensional distance measuring apparatuses described above, in addition, it is particularly necessary to acquire distance information accurately and quickly in order to measure distance information on an object to be measured that is moving.

In order to acquire distance information accurately and quickly, it is necessary to secure a sufficient amount of light received by a light receiving element over a certain range of view angle, and to reduce the light receiving area of the light receiving element in order to increase the scanning frequency during scanning and secure favorable frequency characteristics of the light receiving element.

In view of the foregoing, it is desirable to provide a light condensing lens and a three-dimensional distance measuring apparatus that secure a sufficient amount of light received by a light receiving element and that reduce the light receiving area of the light receiving element.

According to an embodiment of the present invention, there is provided a light condensing lens including a plurality of lenses disposed side by side in a splitting direction of a view angle to condense incident light over a range corresponding to respective split portions of the view angle, the view angle being split in a direction orthogonal to an optical axis of the incident light.

In the light condensing lens, the lenses condense laser light over a range corresponding to respective split portions of the view angle on the light receiving element.

Thus, it is possible to secure a sufficient amount of light received by the light receiving element, and to reduce the light receiving area of the light receiving element.

In the light condensing lens described above, it is desirable that at least one of the plurality of lenses should be disposed to be inclined in the splitting direction at a predetermined angle with respect to the optical axis.

With at least one of the plurality of lenses disposed to be inclined in the splitting direction at a predetermined angle with respect to the optical axis, it is possible to cause the laser light to be incident on the light receiving element with a predetermined diameter that is necessary for distance measurement.

This may improve the measurement accuracy in distance measurement.

In the light condensing lens described above, it is desirable that when the predetermined angle at which the lens is inclined in the splitting direction is defined as $\theta_L$, the following conditional expressions (1) and (2) should be met:

if $n$ is an odd number, $\theta_L=(N-1)\times(\theta/n)$, (1)

and if $n$ is an even number, $\theta_L=(N-\frac{1}{2})\times(\theta/n)$, (2)

where
N is the number of the lens counted with reference to the optical axis,
θ is the view angle in the splitting direction, and
n is the number by which the view angle is split.

With the conditional expressions (1) and (2) met, the inclination angle $\theta_L$ of the lens is optimized.

This allows the light condensing lens to condense laser light over a wide range of view angle in order to secure a sufficient amount of light received by the light receiving element.

In the light condensing lens described above, it is desirable that the lenses should be formed to have an effective optical surface that is shorter in the splitting direction than in a direction orthogonal to the optical axis and orthogonal to the splitting direction, and that when a numerical aperture of the lens in the splitting direction is defined as $NA_i$, the following conditional expression (8) should be met:

$NA_i \leq (1/2f)\{(1/2)(L+d)\sin(\theta/2n)-2d\times\tan(\theta/2n)\}$ (8)

where
f is the focal length of the lens,
L is the back-focus, and
d is the on-axis thickness of the lens.

With the conditional expression (8) met, luminous fluxes do not overlap each other on the incident surface side of the lenses.

This allows proper distance measurement operation.

It is desirable that the light condensing lens described above should be integrally formed by the plurality of lenses.

With the light condensing lens integrally formed by the plurality of lenses, it is not necessary to individually manufacture the plurality of lenses.

Thus, the manufacturing cost may be reduced.

According to an embodiment of the present invention, there is also provided a three-dimensional distance measuring apparatus for measuring a distance to an object to be measured using measurement light, including a light condensing lens that condenses laser light reflected by the object to be measured to be diffused, in which the light condensing lens includes a plurality of lenses disposed side by side in a splitting direction of a view angle to condense incident light over a range corresponding to respective portions of the view angle that are split in a direction orthogonal to an optical axis of the incident light.

In the three-dimensional distance measuring apparatus, the lenses condense laser light over a range corresponding to respective split portions of the view angle on the light receiving element.

Thus, it is possible to secure a sufficient amount of light received by the light receiving element, and to reduce the light receiving area of the light receiving element.

It is desirable that the three-dimensional distance measuring apparatus described above further includes: at least one laser light source that emits laser light as the measurement light; an optical element that shapes the laser light emitted from the laser light source into generally parallel light; a light projecting mirror that is turnable over a predetermined angular range and that reflects the laser light which has been shaped into generally parallel light by the optical element to scan the object to be measured with the laser light; a light receiving element that receives the laser light condensed by the light condensing lens; and a processing section that calculates distance information on the object to be measured by processing a light reception signal generated on the basis of the laser light received by the light receiving element.

With the three-dimensional distance measuring apparatus configured as described above, the distance to the object to be measured may be measured with higher precision.

In the three-dimensional distance measuring apparatus described above, it is desirable that a diaphragm should be formed immediately after an emission surface of the light condensing lens.

With a diaphragm formed immediately after the emission surface of the light condensing lens, luminous fluxes do not overlap each other on the emission surface side of adjacent lenses.

This allows proper distance measurement operation.

In the three-dimensional distance measuring apparatus described above, it is desirable that the light projecting mirror should include a first reflecting mirror and a second reflecting mirror, the first reflecting mirror and the second reflecting mirror being turnable or rotatable about respective axes that are orthogonal to each other, two relay lenses should be disposed between the first reflecting mirror and the second reflecting mirror to cause the laser light emitted from the light source and reflected by the first reflecting mirror to be incident on the second reflecting mirror, the two relay lenses being disposed at conjugate positions, and a focal length of the relay lens disposed on a side of the first reflecting mirror should be longer than a focal length of the relay lens disposed on a side of the second reflecting mirror.

With the first reflecting mirror, the second reflecting mirror, and the two relay lenses disposed as described above, the light condensing angle of the relay lens disposed on the second reflecting mirror side is larger than the light condensing angle of the relay lens disposed on the first reflecting mirror side.

Thus, the scanning angle for the object to be measured may be increased with respect to the turning angle of the first reflecting mirror.

In the three-dimensional distance measuring apparatus described above, it is desirable that a light receiving surface of the light receiving element should be formed to be longer in the splitting direction than in a direction orthogonal to the optical axis and orthogonal to the splitting direction.

With the light receiving surface of the light receiving element formed to be longer in the splitting direction than in a direction orthogonal to the optical axis and orthogonal to the splitting direction, the splitting direction of the view angle coincides with the longitudinal direction of the light receiving surface coincide with each other.

This allows efficient laser light reception, and increases the amount of received laser light.

BRIEF DESCRIPTION OF THE DRAWINGS

FIG. 4 is a block diagram showing the circuitry of the three-dimensional distance measuring apparatus;

DESCRIPTION OF THE PREFERRED EMBODIMENTS

An embodiment of the present invention will be described below with reference to the accompanying drawings.

[Overall Configuration of Three-Dimensional Distance Measuring Apparatus]

The overall configuration of a three-dimensional distance measuring apparatus will be described below.

First Embodiment

First, a three-dimensional distance measuring apparatus 1 according to a first embodiment will be described with reference to FIGS. 1 to 3.

Figure 1:
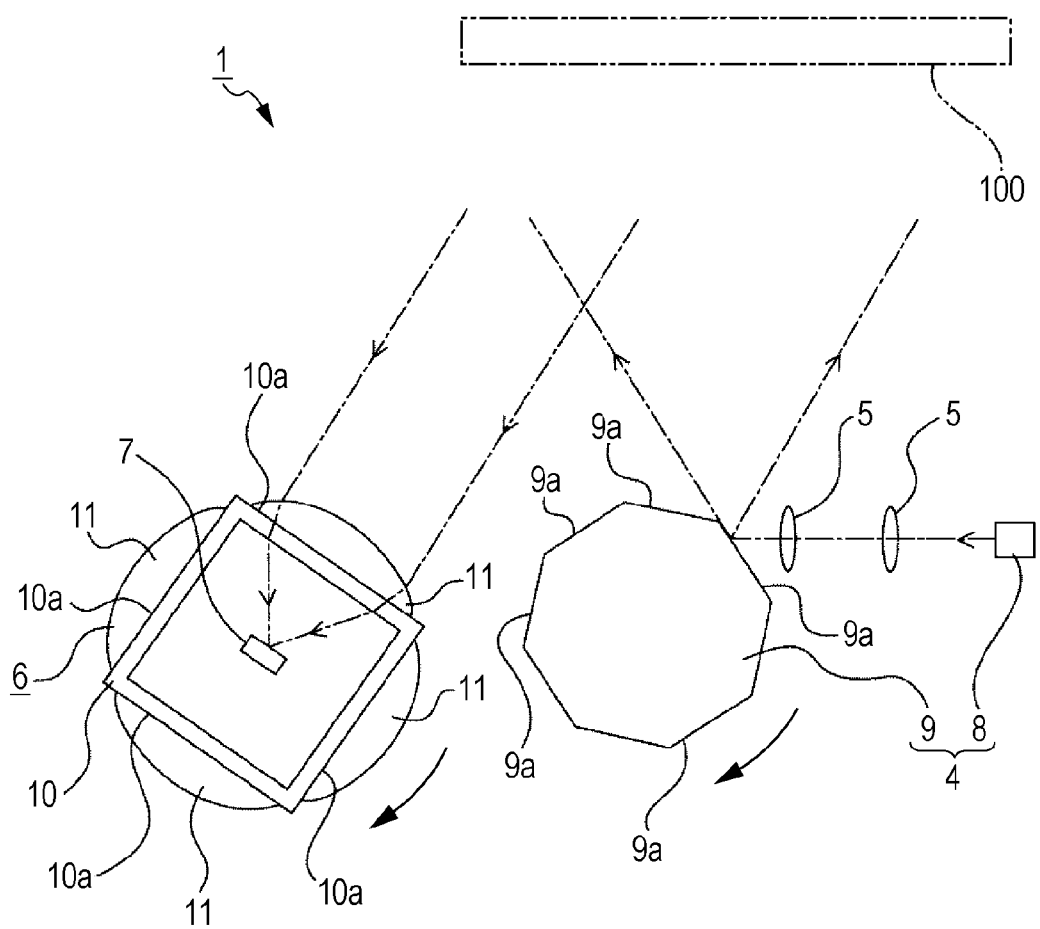
FIG. 1 is a plan view showing the overall configuration of a three-dimensional distance measuring apparatus according to an embodiment of the present invention.
Figure 2:
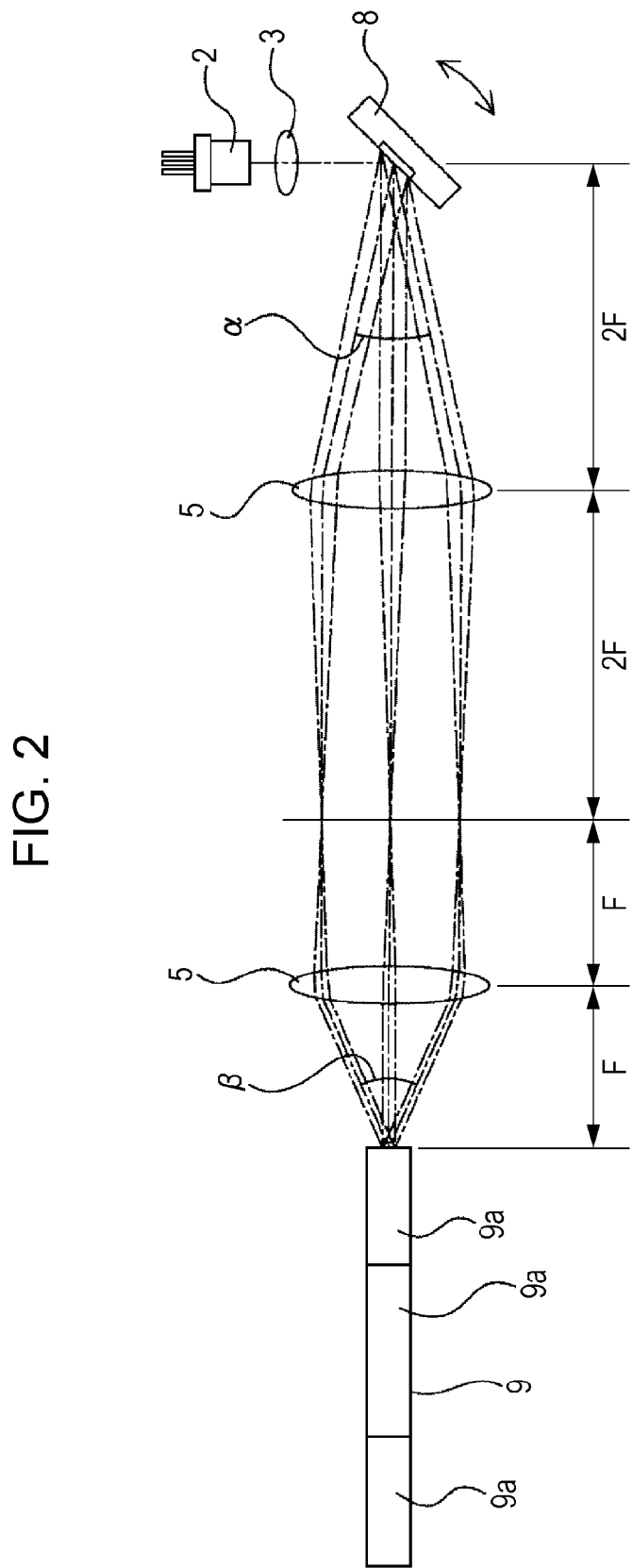
FIG. 2 is a side view showing an optical path from a laser light to a second reflecting mirror and various members disposed in the optical path.
Figure 3:
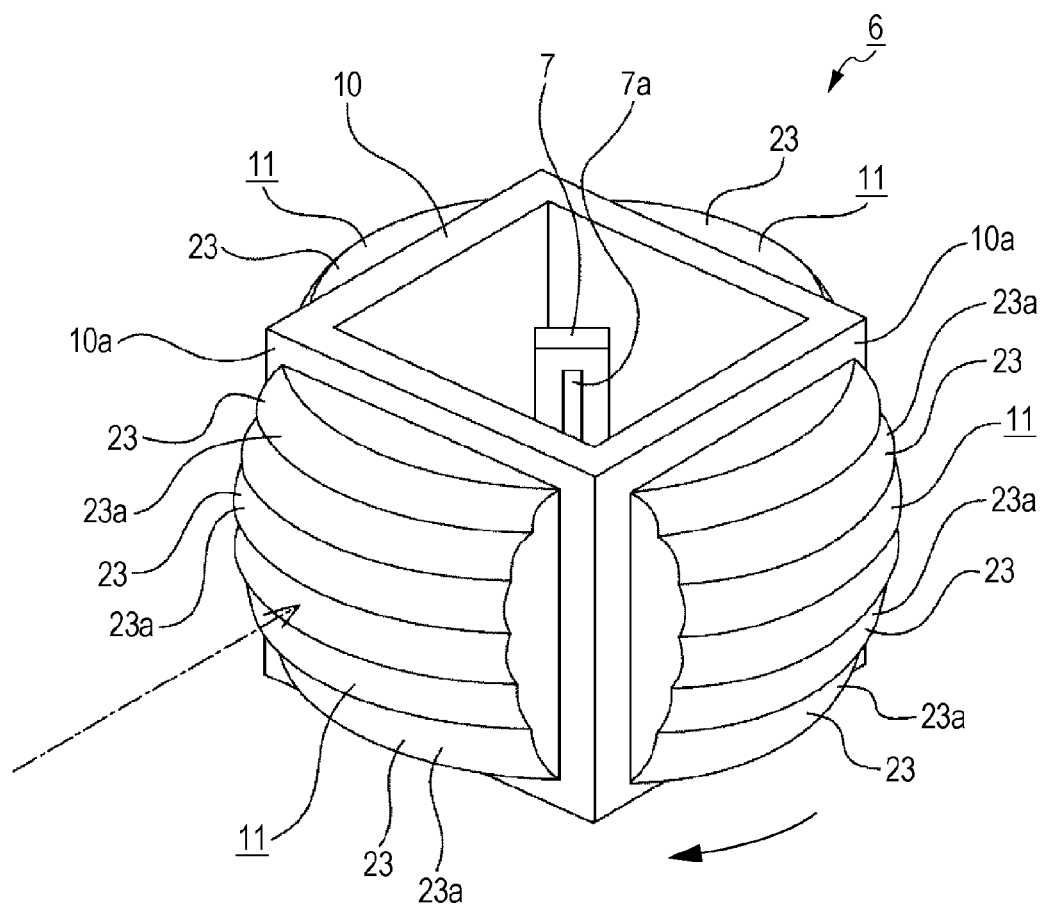
FIG. 3 is an enlarged perspective view of a light condensing unit.

The three-dimensional distance measuring apparatus 1 includes a laser light source 2, an optical element 3, a light projecting mirror 4, a relay lenses 5, 5, a light condensing unit 6, and a light receiving element 7 (see FIGS. 1 to 3).

The laser light source 2 may be a laser diode, for example. The laser light source 2 may oscillate laser light with various wavelengths depending on the constituent element of a semiconductor. A plurality of laser light sources 2 may be provided.

The optical element 3 may be a collimator lens, for example. The optical element 3 has a function of shaping incident laser light into generally parallel light to emit the generally parallel light.

The light projecting mirror 4 includes a first reflecting mirror 8 and a second reflecting mirror 9.

The first reflecting mirror 8 may be a MEMS mirror, for example. The first reflecting mirror 8 is turnable about an axis extending in the horizontal direction, for example.

The second reflecting mirror 9 may be a polygon mirror, for example. The second reflecting mirror 9 is rotatable about an axis extending in the vertical direction, for example. The second reflecting mirror 9 has a shape of a regular octagon with a small thickness in the vertical direction. The outer peripheral surfaces of the second reflecting mirror 9 are respectively formed as eight reflective surfaces $9a, 9a, \ldots$ facing in the horizontal direction.

The relay lenses 5, 5 are each a double-convex lens, and are disposed in spaced relationship between the first reflecting mirror 8 and the second reflecting mirror 9. The relay lenses 5, 5 are disposed at conjugate positions. The focal length of the relay lens 5 disposed on the first reflecting mirror 8 side is longer than the focal length of the relay lens 5 disposed on the second reflecting mirror 9 side, with the ratio of the focal lengths being 2:1, for example. Thus, as shown in FIG. 2, if the focal length of the relay lens 5 disposed on the second reflecting mirror 9 side is defined as F, the distance between the relay lenses 5, 5 is 3F, with the distance between the first reflecting mirror 8 and the relay lens 5 disposed on the first reflecting mirror 8 side being 2F and the distance between the second reflecting mirror 9 and the relay lens 5 disposed on the second reflecting mirror 9 side being F. Thus, if the light condensing angle of the relay lens 5 disposed on the first reflecting mirror 8 side is defined as $\alpha$ and the light condensing angle of the relay lens 5 disposed on the second reflecting mirror 9 is defined as $\beta$, the relationship $\alpha < \beta$ is established.

As shown in FIGS. 1 and 3, the light condensing unit 6 includes a polygon 10 formed in the shape of a polygonal barrel, and light condensing lenses 11, 11, ... respectively attached to the outer peripheral surfaces $10a, 10a, \ldots$ of the polygon 10. The light condensing unit 6 is rotatable about an axis extending in the vertical direction, for example.

The outer peripheral surfaces $10a, 10a, \ldots$ of the polygon 10 are formed in the same size and shape as each other, and configured to face in the horizontal direction.

The light condensing lenses 11 are respectively disposed on the outer peripheral surfaces $10a$ of the polygon 10 except for the outer peripheral portions of the outer peripheral surfaces $10a$, for example.

The light receiving element 7 is formed in the shape of a plate elongated in the vertical direction, for example, and fixed at the position of the rotational center of the light condensing unit 6. Thus, the light condensing unit 6 is rotated about the light receiving element 7. A light receiving surface $7a$ is formed on one surface of the light receiving element 7 that faces in the horizontal direction.

In the three-dimensional distance measuring apparatus 1 configured as described above, as shown in FIGS. 1 and 2, when the laser light source 2 emits laser light, for example infrared light with a wavelength of around 785 nm, the emitted laser light is shaped by the optical element 3 into generally parallel light to be incident on the first reflecting mirror 8 of the light projecting mirror 4. The laser light is reflected by the first reflecting mirror 8 toward the second reflecting mirror 9. In this event, the first reflecting mirror 8 is turned about the axis extending in the horizontal direction over a predetermined angular range.

The laser light reflected by the first reflecting mirror 8 passes through the relay lenses 5, 5, and is sequentially condensed to be incident on the reflective surfaces 9a, 9a, . . . of the second reflecting mirror 9. In this event, the second reflecting mirror 9 is rotated in the horizontal direction, and therefore the laser light is reflected by the reflective surfaces 9a, 9a, . . . over a certain range of angle to be projected to an object to be measured 100 in order to scan the object to be measured 100.

The laser light projected to the object to be measured 100 is reflected by the object to be measured 100, and formed into diffusion light to be sequentially incident on the light condensing lenses 11, 11, . . . of the light condensing unit 6. Since the light condensing unit 6 is rotated in the horizontal direction, the laser light incident on the light condensing lenses 11, 11, . . . is sequentially condensed by the light condensing lenses 11, 11, . . . to be incident on the light receiving element 7.

A light receiving mirror may be disposed between the object to be measured 100 and the light condensing unit 6, in which case the laser light reflected by the object to be measured 100 is reflected by the light receiving mirror to be incident on the light condensing lenses 11, 11, . . . .

A light reception signal is generated on the basis of the laser light incident on the light receiving element 7. The generated light reception signal is processed by a processing section to be discussed later to calculate distance information on the object to be measured 100 for distance measurement.

The distance measurement on the object to be measured 100 may be performed, for example, by calculating the time difference of a pulse wave detected after being reflected by the object to be measured 100 to be incident on the light receiving element 7 with reference to a pulse wave generated when laser light is emitted as a pulse.

[Circuitry of Three-Dimensional Distance Measuring Apparatus]

Next, the circuitry of the three-dimensional distance measuring apparatus 1 will be described with reference to FIG. 4. The circuitry described below corresponds to an example of the three-dimensional distance measuring apparatus 1 described above which uses a so-called Time Of Flight technique in which a distance is calculated by measuring the round-trip period of laser light, that is, the time difference between the emission and the reception of a laser pulse.

The laser light source 2 is driven by a light source driver 12 to emit laser light (a laser pulse) as measurement light. The output of the laser light emitted from the laser light source 2 is controlled on the basis of a light source drive current set by the light source driver 12.

Part of the emitted laser light is incident on a monitoring light receiving element 13 provided in the vicinity of the laser light source 2. The value of the light source drive current set by the light source driver 12 is controlled by an output adjusting section 14 in accordance with an observation voltage generated on the basis of the laser light incident on the monitoring light receiving element 13.

A timing generating block 15 controls pulse emission timing by delivering a drive timing signal for scanning with the laser light to a drive circuit 16 that drives the light projecting mirror 4 and the light condensing unit 6, and delivering a light emission command pulse synchronized with the drive timing signal to the light source driver 12.

The light emission command pulse is also delivered to a time difference measuring block 17 as a reference signal for measuring the round-trip period of the laser light.

The timing generating block 15 also generates a timing signal for observing the voltage of the monitoring light receiving element 13 for adjusting the output of the laser light, and delivers timing information (or phase information) on the light projecting mirror 4 and the light condensing unit 6 to a CPU (Central Processing Unit) 18.

The light receiving element 7 receives the laser light reflected by the object to be measured 100 and condensed by the light condensing unit 6. The light receiving element 7 generates a current pulse that is generally proportional to the amount of the incident laser light. The generated current pulse is converted by an I/V converter circuit 19 into a light reception voltage (light reception signal), and delivered to an amplifier block 20.

The amplifier block 20 amplifies the light reception voltage obtained through the conversion performed by the I/V converter circuit 19, and delivers the amplified light reception voltage to a rise detecting block 21. Because the light reception voltage has a wide dynamic range, the amplifier block 20 includes a variable gain amplifier for signal level adjustment, for example.

The rise detecting block 21 includes a comparator, for example, and converts the input analog pulse into a digital light reception pulse (binary signal) to deliver the digital light reception pulse to the time difference measuring block 17.

The time difference measuring block 17 measures the time difference between the light emission command pulse and the light reception pulse to calculate the round-trip period of the laser light emitted from the laser light 2.

A distance converter block 22 converts the round-trip period (time information) calculated by the time difference measuring block 17 into distance information to deliver the distance information to the CPU 18. The distance information obtained through the conversion is processed by the CPU 18, and output to an external device.

The amplifier block 20, the rise detecting block 21, the time difference measuring block 17, and the distance converter block 22 described above function as a processing section that processes a light reception voltage (light reception signal) generated on the basis of laser light incident on the light receiving element 7 to calculate distance information on the object to be measured 100.

[Specific Configuration of Relay Lenses and Light Projecting Mirror]

In the three-dimensional distance measuring apparatus 1, as described above, the relay lenses 5, 5 are disposed in spaced relationship between the first reflecting mirror 8 and the second reflecting mirror 9, and disposed at conjugate positions (see FIG. 2). With the relay lenses 5, 5 disposed at such positions, the reflective surface of the first reflecting mirror 8 and the reflective surface 9a of the second reflecting mirror 9 coincide in position with the respective focal points of the relay lenses 5, 5, and the focal length (2F) of the relay lens 5 disposed on the first reflecting mirror 8 side is longer than the focal length (F) of the relay lens 5 disposed on the second reflecting mirror 9 side.

Thus, the scanning angle for the object to be measured 100 may be increased with respect to the turning angle of the first reflecting mirror 8.

Meanwhile, the light condensing angle β of the relay lens 5 disposed on the second reflecting mirror 9 side is larger than the light condensing angle α of the relay lens 5 disposed on the first reflecting mirror 8 side, which results in a high reduction ratio of the laser light. This allows the thickness of the second reflecting mirror 9 to be accordingly reduced for size reduction.

[Relationship between Second Reflecting Mirror and Polygon]

Next, the relationship between the second reflecting mirror 9 in which a polygon mirror is used and the polygon 10 of the light condensing unit 6 will be described.

In the three-dimensional distance measuring apparatus 1, the second reflecting mirror 9, which is used as means for reflecting laser light, is formed in the shape of a regular octagon, and the polygon 10, which is used as means for transmitting laser light, is formed to have a square external shape. That is, the second reflecting mirror 9 and the polygon 10 are respectively formed in a regular polygon with 2M sides and a regular polygon with M sides (M is an integer of 3 or more).

With only the principal ray, and not the diameter, of the laser light taken into consideration, it is possible to scan the object to be measured 100 over a scanning angle of 2×(360°/8)=90° for one reflective surface 9a of the second reflecting mirror 9, which has a regular octagonal shape. Meanwhile, it is possible to receive the laser light having scanned the object to be measured 100 over a scanning angle of 360°/4=90° for one outer peripheral surface 10a of the polygon 10, which has a square external shape.

Thus, in the case where the second reflecting mirror 9, which is used as reflecting means, and the polygon 10, which is used as transmitting means, are respectively formed in a regular polygon with 2M sides and a regular polygon with M sides, laser light is projected to one reflective surface 9a, or incident on one outer peripheral surface 10a, over a scanning angle of 90°, which allows efficient distance measurement.

[Rotational Speeds of Second Reflecting Mirror and Polygon]

Next, the rotational speeds of the second reflecting mirror 9 in which a polygon mirror is used and the polygon 10 of the light condensing unit 6 will be described with reference to FIGS. 5A, 5B, 6A, and 6B.

Figure 5A:
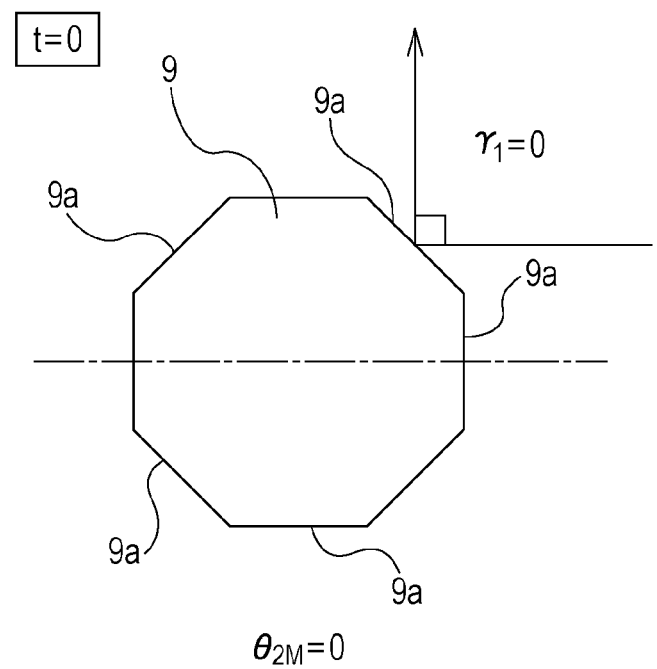
FIG. 5A is a conceptual diagram showing the state of the second reflecting mirror at the time when the laser light source has started emitting laser light.
Figure 5B:
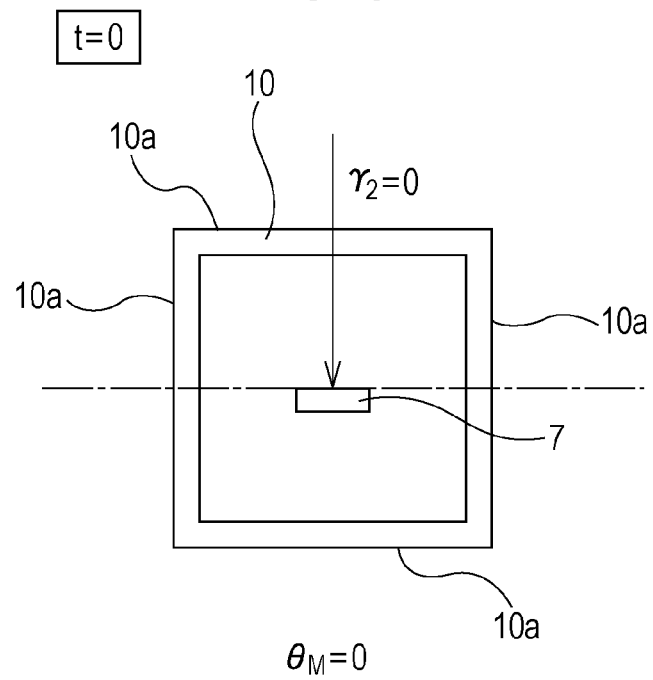
FIG. 5B is a conceptual diagram showing the state of a polygon at the time when the laser light source has started emitting laser light.
Figure 6A:
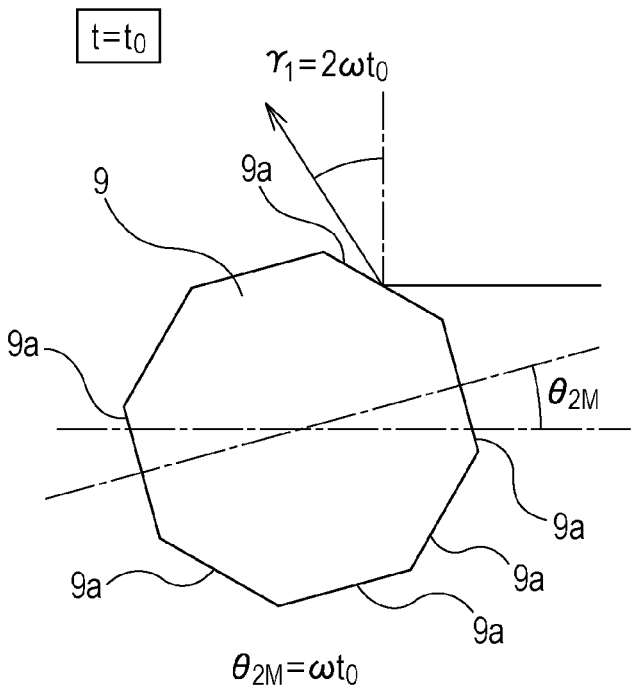
FIG. 6A is a conceptual diagram showing the state of the second reflecting mirror at the time when a certain period has passed after the laser light source started emitting laser light.
Figure 6B:
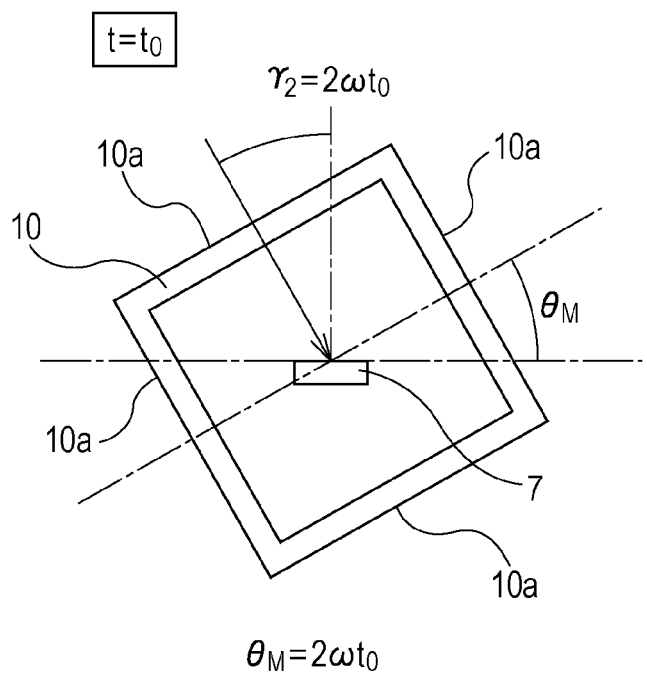
FIG. 6B is a conceptual diagram showing the state of the polygon at the time when a certain period has passed after the laser light source started emitting laser light.

FIGS. 5A and 5B show the state at the time when the laser light source 2 has started emitting laser light, that is, the state at t=0 where t indicates the time having elapsed after the emission of the laser light. At t=0, for example, the laser light is reflected by the reflective surface 9a of the second reflecting mirror 9 into a direction orthogonal to the incident direction. The light projecting angle $\gamma_1$ of the laser light at the second reflecting mirror 9 in the horizontal direction at this time is determined as $\gamma_1=0$ (see FIG. 5A). Thus, the rotational angle $\theta_{2M}$ of the second reflecting mirror 9 is determined as $\theta_{2M}=0$. Also, the light receiving angle $\gamma_2$ of the laser light incident on the polygon 10 in the horizontal direction at t=0 is determined as $\gamma_2=0$ (see FIG. 5B). The rotational angle $\theta_M$ of the polygon 10 at this time is determined as $\theta_M=0$.

When the angular speed of the second reflecting mirror 9 is defined as w, the rotational angle $\theta_{2M}$ over which the second reflecting mirror 9 rotates from t=0 to t=$t_0$, at which a certain period $t_0$ has elapsed, is determined as $\theta_{2M}=\omega t_0$. Since the object to be measured 100 is scanned with the reflected laser light, the light projecting angle $\gamma_1$ of the laser light at the second reflecting mirror 9 is twice the rotational angle $\theta_{2M}$, represented as $\gamma_1=2\theta_{2M}=2\omega t_0$ (see FIG. 6A).

Meanwhile, when the angular speed of the polygon 10 is also defined as $\omega$ in the same way as the angular speed of the second reflecting mirror 9, the rotational angle $\theta_M$ over which the polygon 10 rotates from t=0 to t=$t_0$, at which the certain period $t_0$ has elapsed, is determined as $\theta_M=\omega t_0$. Since the polygon 10 transmits the laser light, the light receiving angle $\gamma_2$ of the laser light incident on the polygon 10 from the object to be measured 100 is represented as $\gamma_2=\theta_M=\omega t_0$.

Thus, in the same period from t=0 to t=$t_0$, the light projecting angle $\gamma_1$ becomes twice the light receiving angle $\gamma_2$, as a result of which the light projecting angle $\gamma_1$ and the light receiving angle $\gamma_2$ do not coincide with each other.

Accordingly, in the three-dimensional distance measuring apparatus 1, the ratio of the respective angular speeds of the second reflecting mirror 9 and the polygon 10 is set to 1:2 so that the light projecting angle $\gamma_1$ of the laser light at the second reflecting mirror 9 and the light receiving angle $\gamma_2$ of the laser light for the polygon 10 coincide with each other. Thus, when the angular speed of the second reflecting mirror 9 is defined as $\omega$, the angular speed of the polygon 10 is determined as $2\omega$, and the light receiving angle $\gamma_2$ of the laser light incident on the polygon 10 during a period from t=0 to t=$t_0$ is represented as $\gamma_2=\theta_M=2\omega t_0$, which coincides with $\gamma_1$ (see FIG. 6B).

In this way, in the three-dimensional distance measuring apparatus 1, the light projecting angle $\gamma_1$ of the laser light at the second reflecting mirror 9 and the light receiving angle $\gamma_2$ of the laser light for the polygon 10 coincide with each other, which allows efficient distance measurement.

[Specific Configuration of Light Condensing Unit]

Figure 7:
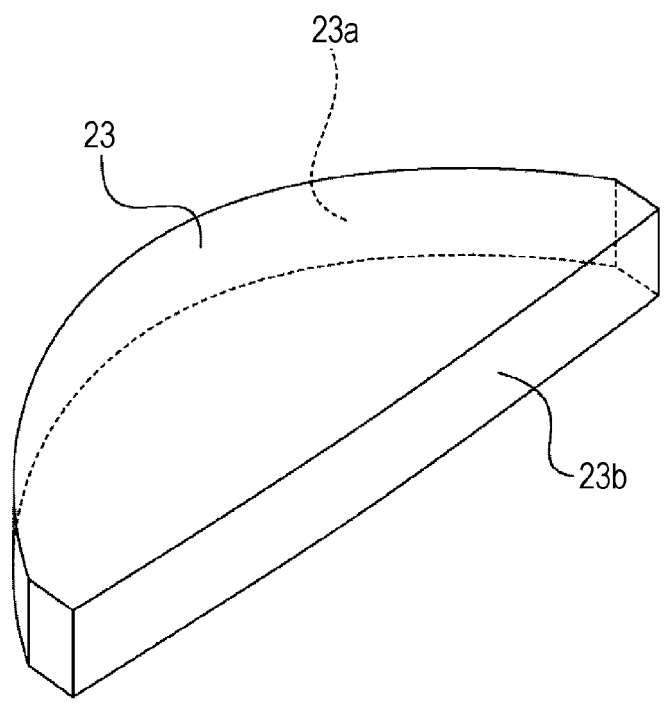
FIG. 7 is an enlarged perspective view of a lens.

The light condensing lens 11 of the light condensing unit 6 is formed as an assembly of a plurality of lenses 23, 23, . . . , for example an assembly of six lenses 23, 23, . . . (see FIGS. 3, 7, and 8).

Figure 8:
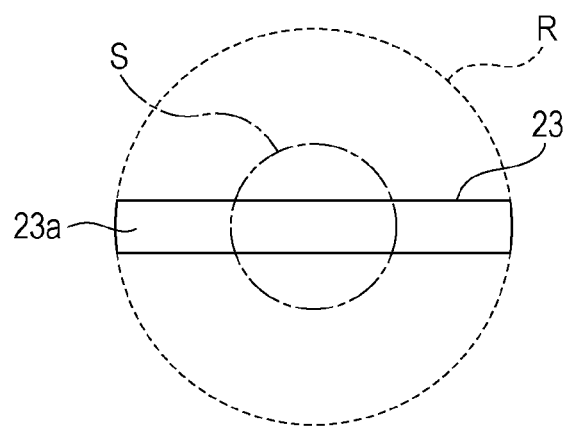
FIG. 8 is an enlarged front view of the lens.

The lens 23 is formed in a horizontally long shape as a so-called I-cut lens by cutting both the upper and lower portions of a concentric aspherical lens R of a diameter indicated by the dotted line in FIG. 8 such that both the upper and lower surfaces are each a planar surface. The circle S depicted by the dot-and-dash line in FIG. 8 has a lens diameter that is necessary to condense an amount of light for proper distance measurement in the case where the lens were circular. The area of an incident surface 23a of the lens 23 is set to be equal to the area of the circle S.

Figure 9:
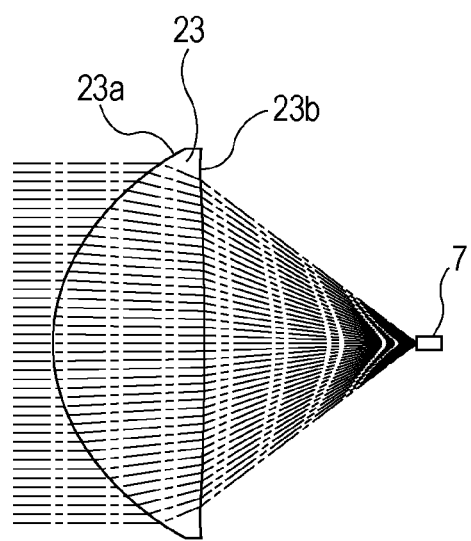
FIG. 9 is an enlarged plan view showing the state in which the lens condenses laser light.

In the three-dimensional distance measuring apparatus 1, as described above, the light projecting angle $\gamma_1$ and the light receiving angle $\gamma_2$ coincide with each other in the horizontal direction. Therefore, no view-angle component is generated in condensing the laser light. Thus, as shown in FIG. 9, the laser light is properly condensed by the lens 23 to be incident on the light receiving element 7.

Meanwhile, in the vertical direction, the first reflecting mirror 8 is turned about the axis extending in the horizontal direction so that the laser light is reflected over a predetermined angular range. Therefore, it is necessary for the light condensing lens 11 to condense laser light over a wide range of view angle corresponding to the predetermined angular range.

In general, if it is attempted to condense laser light over such a wide range of view angle using a single lens, the image height on the light receiving element may be extremely large, which does not allow the use of a light receiving element with high frequency characteristics. Thus, a plurality of lenses disposed side by side in the vertical direction may be used so that each of the lenses covers a split portion of the view angle, which reduces the image height on the light receiving element to allow the use of a light receiving element with high frequency characteristics.

If the numerical aperture of the lens in the vertical direction is large, however, the light receiving element may not be used commonly among the plurality of lenses, as a result of which a light receiving element may be necessary for each of the lenses.

Accordingly, in the three-dimensional distance measuring apparatus 1, the light condensing lens 11 is formed by the plurality of lenses 23, 23, . . . , which are each formed as an I-cut lens with planar upper and lower surfaces. The lenses 23, 23, . . . are disposed as described below, which reduces the image height on the light receiving element 7 to allow the use of the light receiving element 7 with high frequency characteristics and a small light receiving surface.

Figure 10:
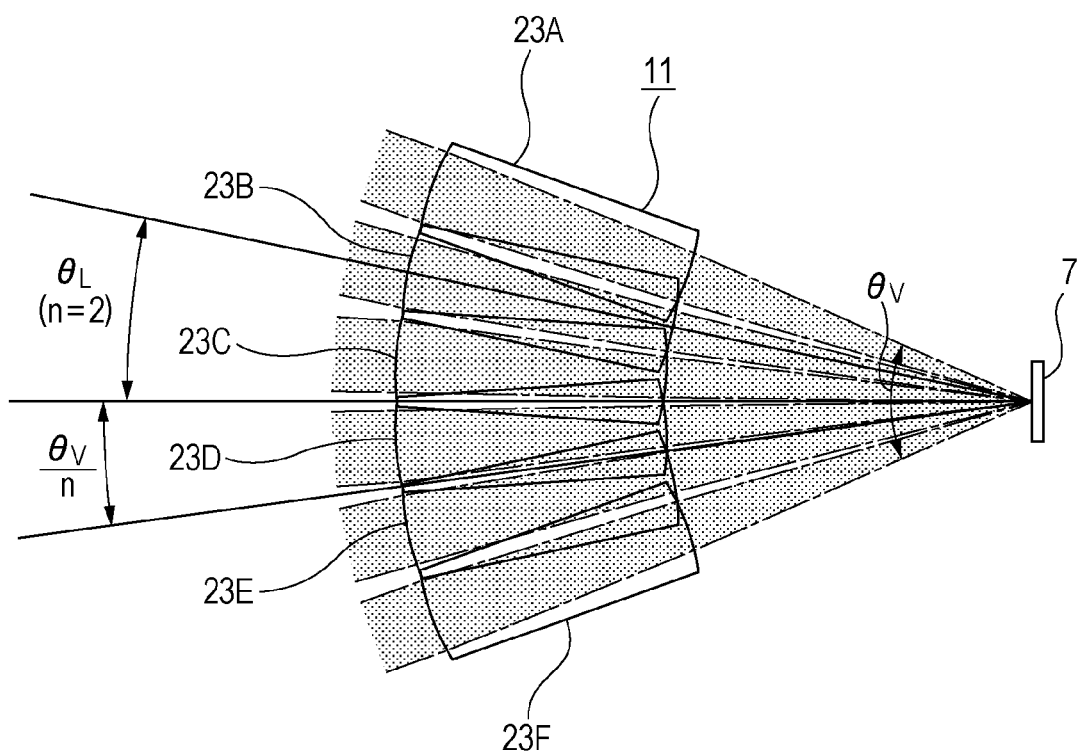
FIG. 10 is a conceptual diagram illustrating view angles covered by lenses.

In the light condensing lens 11, the lenses 23, 23, . . . are disposed to be stacked in the vertical direction, which is a direction orthogonal to the optical axis of the incident laser light, and each of the lenses 23, 23, . . . is inclined by a predetermined angle with respect to the horizontal direction (see FIG. 10). The lenses 23, 23, . . . are formed to have the same shape and size as each other, and stacked such that their upper and lower portions overlap each other. Therefore, the shape of the lenses 23, 23, . . . is changed to form the light condensing lens 11. In FIGS. 10 to 15, however, the lenses 23 are shown as overlapping each other for convenience of description.

With the light condensing lens 11 formed by the plurality of lenses 23, 23, . . . as described above, the view angle $\theta_V$ is split in the splitting direction, that is, in the vertical direction, into n portions (n is an integer of 2 or more), the number n being the number of the lenses 23, 23, . . . . In the three-dimensional distance measuring apparatus 1, the number n is determined as n=6, for example, and the six lenses 23, 23, . . . cover respective portions of the view angle θ that are split in the vertical direction so that each of the lenses 23, 23, . . . covers a reduced portion of the view angle.

It should be noted, however, that the number of the lenses 23, 23, . . . is not limited to six, and may be any plural value.

The view angle covered by one lens 23 is $\theta_V/n$. When the angle at which each of the lenses 23, 23, . . . is inclined with respect to the horizontal direction (the direction of the optical axis) is defined as an inclination angle $\theta_L$, the inclination angle $\theta_L$ is represented by the following conditional expressions (1) and (2):

$$\text{if } n \text{ is an odd number, } \theta_L=(N-1)\times(\theta_V/n), \quad (1)$$

and $$\text{if } n \text{ is an even number, } \theta_L=(N-\tfrac{1}{2})\times(\theta_V/n) \quad (2)$$

where

N is the number of the lens counted with reference to the optical axis, $\theta_V$ is the view angle in the vertical direction, and n is the number by which the view angle is split.

$\theta_V$ is equivalent to θ in the conditional expressions (1) and (2) according to an embodiment.

In the case of the light condensing lens 11 with n=6, the conditional expression (2) is applied to result in $\theta_V$=48°, for example.

When the lenses 23, 23, . . . are defined as lenses 23A, 23B, . . . , 23F sequentially from the upper side as shown in FIG. 10, $\theta_L$=20° for the lenses 23A, 23F, $\theta_L$=12° for the lenses 23B, 23E, and $\theta_L$=4° for the lenses 23C, 23D. Thus, the lenses 23A, 23B, 23C are respectively inclined upward with respect to the horizontal direction by an angle of 20°, 12°, 4° and the lenses 23F, 23E, 23D are respectively inclined downward with respect to the horizontal direction by an angle of 20°, 12°, 4° to form the light condensing lens 11.

These lenses 23A to 23F cover equal portions of a view angle of $\theta_V$=48°, or a view angle of 8°(±4°) each.

With the lenses 23, 23, . . . inclined with respect to the horizontal direction as described above, it is possible for the light condensing lens 11 to condense laser light over a wide range of view angle.

The lenses 23, 23, . . . are inclined with respect to the horizontal direction so as to meet the conditional expressions (1) and (2). Thus, the inclination angle $\theta_L$ of the lenses 23, 23, . . . is optimized, which allows the light condensing lens 11 to condense laser light over a wide range of view angle in order to secure a sufficient amount of light received by the light receiving element 7.

Next, the image height of luminous flux of laser light having a view angle and the common use of the light receiving element 7 among the lenses 23, 23, . . . will be described.

In the vertical direction, a view angle of $\theta_V$ is provided as described above, and therefore an image height y indicated by the following conditional expression (3) is generated on the light receiving element 7:

$$y=f\times\tan(\theta_V/2n) \quad (3)$$

where f is the focal length of the lens.

The image height is reduced by using the plurality of lenses 23, 23, . . . to cover respective split portions of a view angle compared to a case where a single lens is used to condense luminous flux of laser light having the view angle.

The lenses 23, 23, . . . are each formed as an I-cut lens with planar upper and lower surfaces. Therefore, the numerical aperture $NA_V$ of the lenses 23, 23, . . . in the vertical direction is small compared to a case where a plurality of common circular lenses are used to cover respective split portions of the view angle. The numerical aperture $NA_V$ of the lenses 23, 23, . . . in the vertical direction is represented by the following conditional expression (4):

$$NA_V=\sin(\theta_V/2n) \quad (4)$$

Thus, the numerical aperture $NA_V$ of the lenses 23, 23, . . . in the vertical direction may be set to a value of the conditional expression (4) or less. Since the numerical aperture $NA_V$ of the lenses 23, 23, . . . in the vertical direction is small, the light receiving element 7 may be used commonly among the lenses 23, 23, . . . .

The lenses 23, 23, . . . cover respective split portions of the view angle $\theta_V$ as described above, and it is necessary that luminous fluxes of laser light incident on lenses 23, 23 that are adjacent in the splitting direction (vertical direction) should not overlap each other inside. Thus, it is necessary that the luminous fluxes should overlap each other on neither the incident surfaces 23a, 23a nor the emission surfaces 23b, 23b of lenses 23, 23 that are adjacent in the vertical direction.

First, a diaphragm that prevents overlap between luminous fluxes of laser light will be described with reference to FIGS. 11 and 12. The diaphragm refers to an optical diaphragm formed in the optical path in contrast to an opening that transmits laser light so that luminous flux of the laser light is incident on the light receiving surface 7a of the light receiving element 7, and is not specifically equivalent to a mechanical diaphragm or a diaphragm member.

The following description of the diaphragm which prevents overlap between luminous fluxes of laser light will be made only for two lenses 23, 23 that are adjacent in the vertical direction for ease of description.

Figure 11:
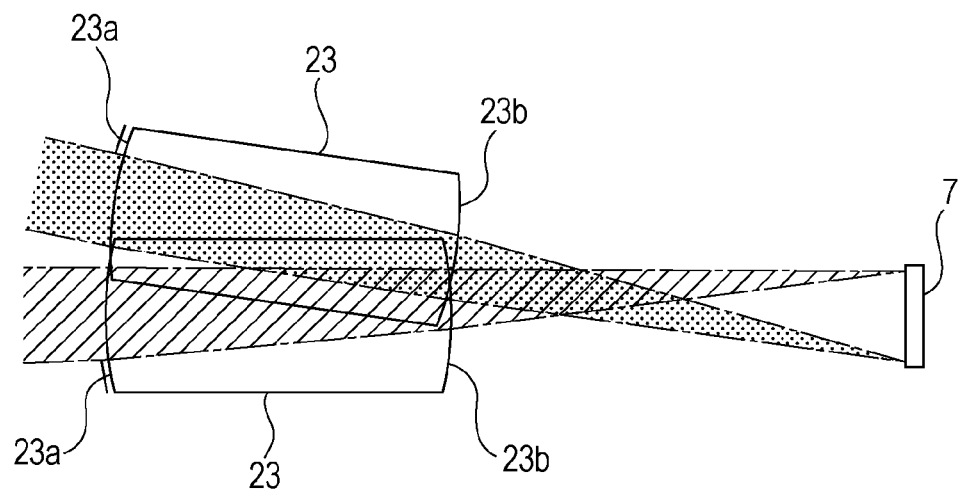
FIG. 11 is a conceptual diagram showing the state in which luminous fluxes overlap each other on the emission surface side of the lenses.
Figure 12:
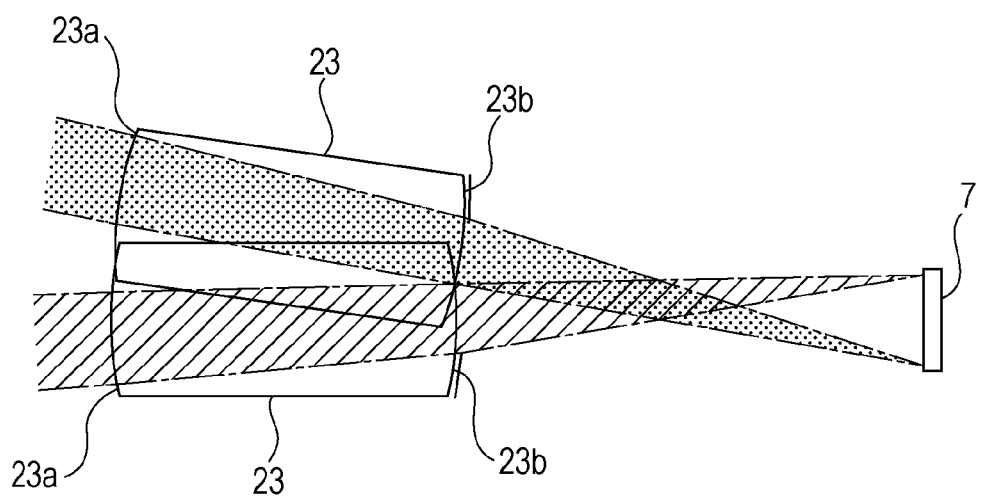
FIG. 12 is a conceptual diagram showing the state in which an overlap between luminous fluxes on the emission surface side of the lenses has been eliminated.

In FIGS. 11 and 12, luminous flux incident on the upper lens 23 from the highest position in the view angle covered by the upper lens 23 and luminous flux incident on the lower lens 23 from the lowest position in the view angle covered by the lower lens 23 are shown.

In the case where the diaphragm which narrows luminous flux of laser light is formed immediately before the incident surfaces 23a, 23a of the lenses 23, 23, for example, the laser light having a view angle of $\pm\theta_V/2n$ on the side of the emission surfaces 23b, 23b may significantly deviate in the vertical direction, and luminous fluxes tend to overlap each other on the side of the emission surfaces 23b, 23b (see FIG. 11).

Accordingly, in order that luminous fluxes do not overlap each other on the side of the emission surfaces 23b, 23b of adjacent lenses 23, 23, it is necessary to extremely reduce the numerical aperture $NA_V$ in the vertical direction.

Thus, in order that luminous fluxes do not overlap each other on the side of the emission surfaces 23b, 23b of adjacent lenses 23, 23, it is desirable to form the diaphragm immediately after the emission surfaces 23b, 23b (see FIG. 12).

Next, the value of the numerical aperture which prevents overlap between luminous fluxes of laser light on the side of the incident surfaces 23a, 23a will be described with reference to FIGS. 13 to 15.

Figure 13:
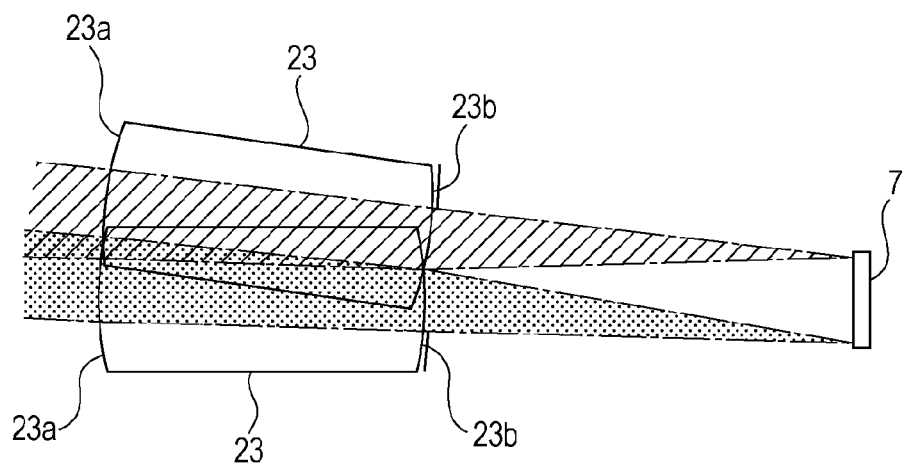
FIG. 13 is a conceptual diagram showing the state in which luminous fluxes overlap each other on the incident surface side of the lenses.
Figure 14:
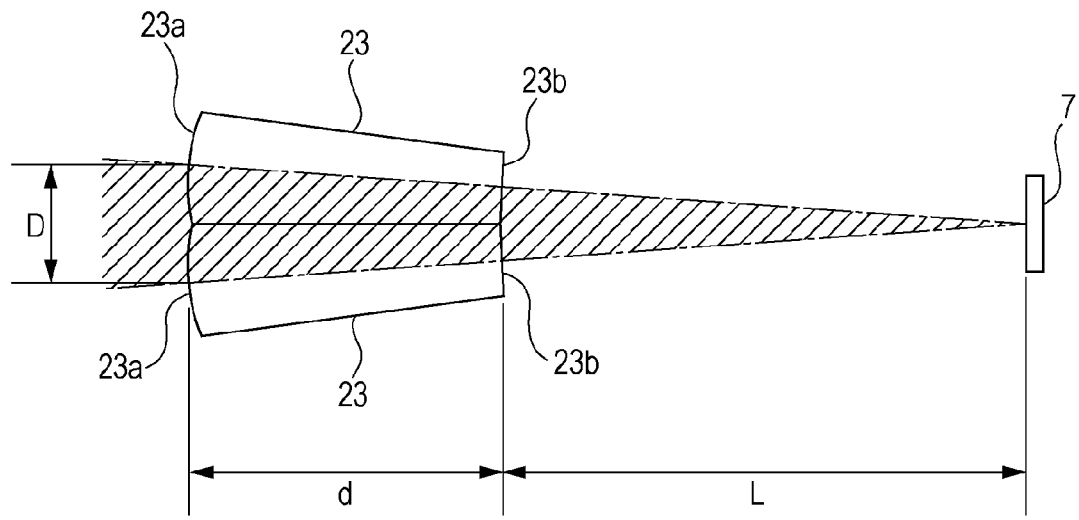
FIG. 14 is a conceptual diagram illustrating how an overlap between luminous fluxes on the incident surface side of the lenses is eliminated.
Figure 15:
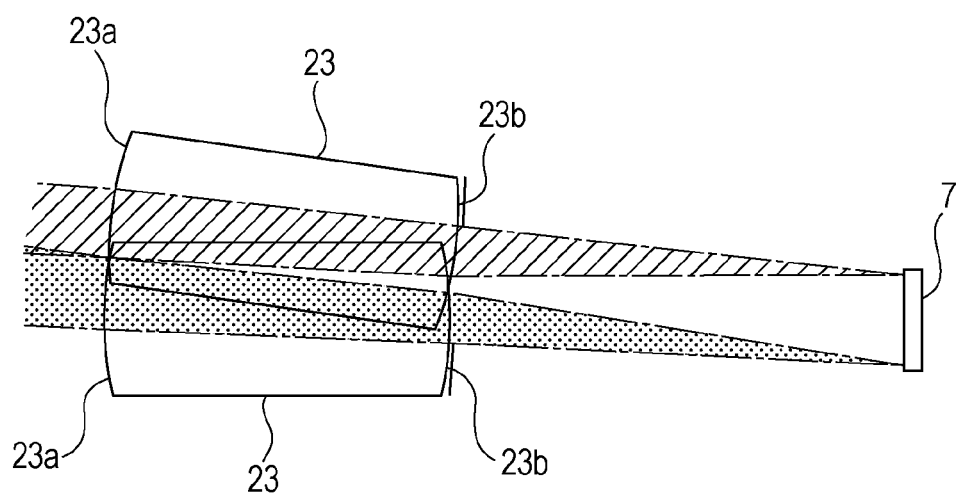
FIG. 15 is a conceptual diagram showing the state in which an overlap between luminous fluxes on the incident surface side of the lenses has been eliminated.

In FIGS. 13 and 15, luminous flux incident on the upper lens 23 from the lowest position in the view angle covered by the upper lens 23 and luminous flux incident on the lower lens 23 from the highest position in the view angle covered by the lower lens 23 are shown.

In the case where the diaphragm is formed immediately after the emission surfaces 23b, 23b as described above, the laser light may significantly deviate in the vertical direction on the side of the incident surfaces 23a, 23a. Thus, if the lenses 23, 23 are designed with a numerical aperture $NA_V$ determined with only the side of the emission surfaces 23b, 23b taken into consideration, luminous fluxes may overlap each other on the side of the incident surfaces 23a, 23a as shown in FIG. 13.

Accordingly, the conditions that luminous fluxes do not overlap each other on the side of the incident surfaces 23a, 23a will be described below with reference to FIG. 14.

When the inter-center distance between the incident surfaces 23a, 23a of the lenses 23, 23 in the vertical direction is defined as D, the inter-center distance D is represented by the following conditional expression (5):

$$D = 2(L+d)\sin(\theta_V/2n) \quad (5)$$

where
L is the back-focus, and
d is the on-axis thickness of the lens.

When the shift amount of the principal ray in luminous flux of laser light having a view angle of $\pm\theta_V/2n$ on the incident surfaces 23a, 23a is defined as Y, the shift amount Y is represented by the following conditional expression (6):

$$Y = d \times \tan(\theta_V/2n) \quad (6)$$

If the diameter of luminous flux of laser light is defined as $\phi$, the condition for the diameter $\phi$ that luminous fluxes do not overlap each other on the side of the incident surfaces 23a, 23a is represented by the following conditional expression (7):

$$2(Y + \phi/2) \leq D \quad (7)$$

Thus, the condition for the numerical aperture $NA_V$ that luminous fluxes do not overlap each other on the side of the incident surfaces 23a, 23a is represented by the following conditional expression (8):

$$NA_V \leq (1/2f)\{(1/2)(L+d)\sin(\theta_V/2n) - 2d \times \tan(\theta_V/2n)\} \quad (8)$$

$NA_V$ is equivalent to $NA_t$ in the conditional expression (8) according to an embodiment, and $\theta_V$ is equivalent to $\theta$ in the conditional expression (8) according to an embodiment.

When the numerical aperture $NA_V$ meets the conditional expression (8) for the lenses 23, 23, ..., luminous fluxes do not overlap each other on the side of the incident surfaces 23a, 23a (see FIG. 15).

In the three-dimensional distance measuring apparatus 1, the diaphragm is formed immediately after the emission surfaces 23b, 23b, ... of the lenses 23, 23, ..., and the numerical aperture $NA_V$ of the lenses 23, 23, ... in the vertical direction meets the conditional expression (8).

Thus, in the three-dimensional distance measuring apparatus 1, luminous fluxes of laser light incident on lenses 23, 23, ... that are adjacent to each other in the vertical direction do not overlap each other inside, which allows proper distance measurement operation of the three-dimensional distance measuring apparatus 1.

The light condensing lens 11 configured as described above is integrally formed as an assembly of the lenses 23, 23, ..., for example.

With the light condensing lens 11 integrally formed in this way, the manufacturing cost may be reduced.

The lens 23 is formed as an aspherical lens made of a resin material, for example, and has an aspherical surface that is axially symmetric about the optical axis. The lens 23 is formed in a shape obtained by substituting the values in Table 1 into the following formula. In the formula, r is the distance from the optical axis in a direction orthogonal to the optical axis, Z(r) is the surface shape at the distance r from the optical axis, K is the conic constant, c is the radius of curvature, and $A_{2i}$ is the aspherical coefficient.

$$Z(r) = \frac{cr^2}{1 + \{1 - (1+K)c^2r^2\}^{1/2}} + \sum_{i=0}^{5} A_{2i} r^{2i} \quad \text{[Formula 1]}$$

TABLE 1

| | c | K | $A_0$ | $A_2$ | $A_4$ | $A_6$ | $A_8$ | $A_{10}$ |
|---|---|---|---|---|---|---|---|---|
| INCIDENT SURFACE | 12.88164 | −0.95727 | 2.57E−05 | 1.05E−07 | −7.33E−10 | 2.99E−12 | 0.00E+00 | 0.00E+00 |
| EMISSION SURFACE | −76.2462 | −177.139 | 1.08E−05 | −9.16E−08 | 7.39E−10 | −1.70E−12 | 0.00E+00 | 0.00E+00 |

| | |
|---|---|
| index (785 nm) | 1.535608 |
| ON-AXIS THICKNESS | 11 mm |
| $NA_L$ | 0.11 |
| $NA_V$ | 0.61 |
| FOCAL LENGTH | 21.5 mm |
| EFFECTIVE AREA OF INCIDENT SURFACE | 60.3 mm² |

In addition to the aspherical coefficient and so forth, Table 1 also shows the refractive index, the on-axis thickness, the numerical aperture $NA_V$ in the vertical direction, the numerical aperture $NA_L$ in the horizontal direction, the focal length, and the effective area of the incident surface. In Table 1, "E-i" is an exponential expression using base 10, that is, "$10^{-i}$". For example, "0.12345E-05" represents "$0.12345 \times 10^{-5}$".

[Specific Configuration of Light Receiving Element]

The image height in the horizontal direction is insignificant because the light condensing unit 6 rotates in the horizontal direction. The light receiving element 7 may thus be formed with a minimum length in the horizontal direction.

The length of the light receiving element 7 in the vertical direction may be set such that the light receiving element 7 may receive laser light equivalent to the image height y indicated by the conditional expression (3).

Thus, the size of the light receiving element 7 may be reduced, which allows the use of the light receiving element 7 having high frequency characteristics to support high-speed operation.

The light receiving surface 7a of the light receiving element 7 may be set to be longer in the vertical direction, which is the splitting direction of the view angle, than in the horizontal direction. This allows efficient laser light reception, and increases the amount of received laser light.

It is desirable that the number of light receiving elements 7 should be smaller than the number of the lenses 23, 23, . . . . A single light receiving element 7 may be used commonly among the lenses 23, 23, . . . as described above.

[Other Configurations]

Figure 16:
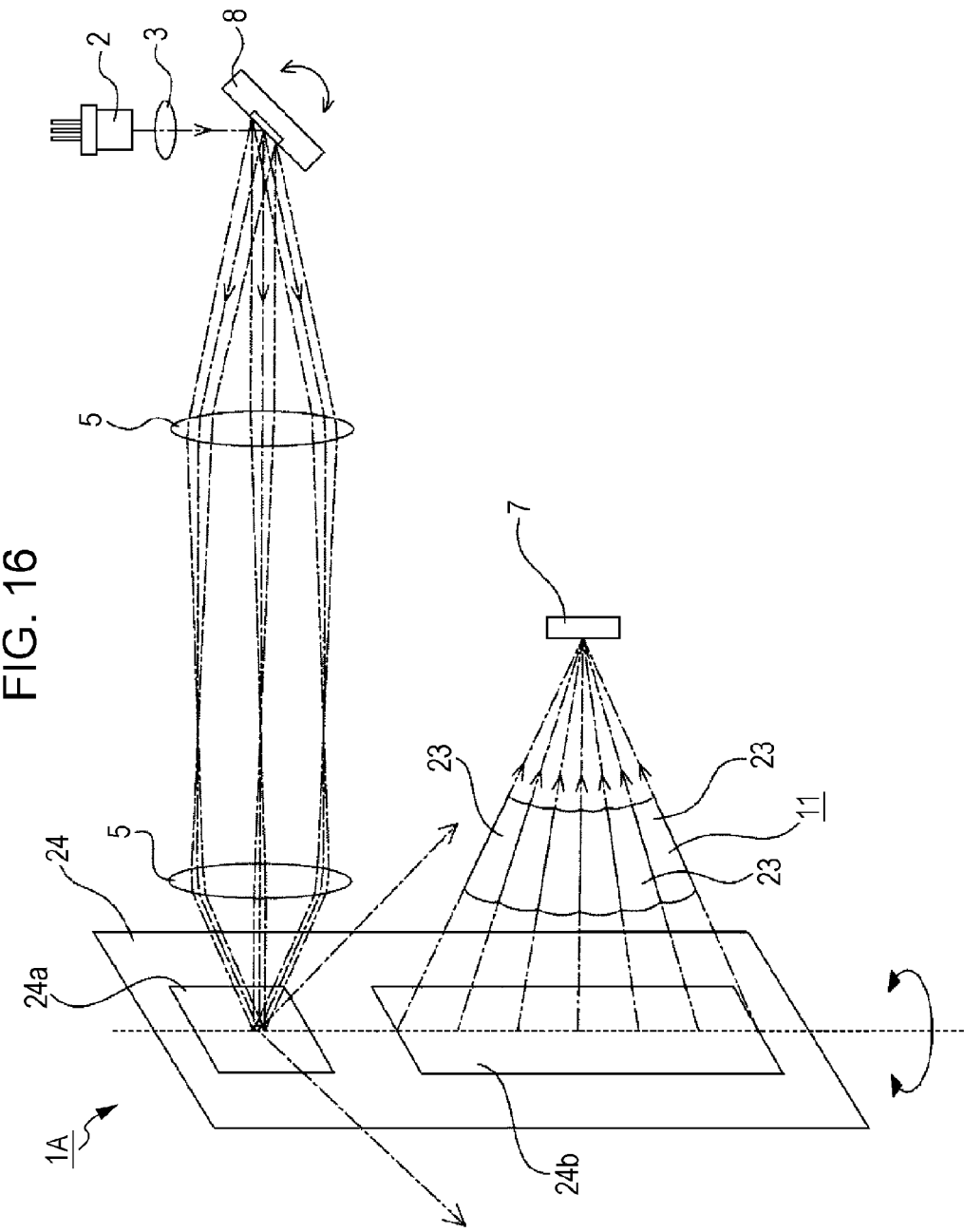
FIG. 16 is a perspective view showing an exemplary three-dimensional distance measuring apparatus with a galvano mirror.

In the three-dimensional distance measuring apparatus 1 described above, the second reflecting mirror 9 and the polygon 10 are rotated in the horizontal direction for distance measurement. However, as shown, for example, in FIG. 16, the second reflecting mirror 9 and the polygon 10 may be replaced with a galvano mirror 24 to form a three-dimensional distance measuring apparatus 1A.

In the three-dimensional distance measuring apparatus 1A, the light condensing lens 11 is fixed between the galvano mirror 24 and the light receiving element 7. The galvano mirror 24 has a first reflective surface 24a and a second reflective surface 24b, and is turnable in the horizontal direction.

In the three-dimensional distance measuring apparatus 1A, when laser light is emitted from the laser light 2, the emitted laser light is shaped into generally parallel light by the optical element 3. After being reflected by the first reflecting mirror 8, the laser light passes through the relay lenses 5, 5, and are condensed to be incident on the first reflective surface 24a of the galvano mirror 24. At this time, the galvano mirror 24 is turned in the horizontal direction, and therefore the laser light is reflected by the first reflective surface 24a at an angle in a certain range to be projected to the object to be measured 100 in order to scan the object to be measured 100.

The laser light projected to the object to be measured 100 is reflected by the object to be measured 100, and formed into diffusion light, which is incident on the second reflective surface 24b of the galvano mirror 24 and reflected by the second reflective surface 24b to be incident on the light condensing lens 11. The laser light incident on the light condensing lens 11 is condensed to be incident on the light receiving element 7.

A light reception signal is generated on the basis of the laser light incident on the light receiving element 7. The generated light reception signal is processed by a processing section to calculate distance information on the object to be measured 100 for distance measurement.

By using the galvano mirror 24 having the first reflective surface 24a and the second reflective surface 24b as described above, the mechanism may be simplified.

CONCLUSION

As has been described above, the three-dimensional distance measuring apparatus 1, 1A is provided with the light condensing lens 11 including the lenses 23, 23, . . . which condense laser light over respective split portions of a view angle to direct the laser light to the light receiving element 7. Therefore, it is possible to secure a sufficient amount of light received by the light receiving element 7, and to reduce the light receiving area of the light receiving element 7.

Thus, it is possible to acquire distance information accurately and quickly, which makes it possible to increase the scanning frequency during scanning and secure favorable frequency characteristics of the light receiving element 7.

In the light condensing lens 11, the plurality of lenses 23, 23, . . . are disposed to be inclined at respective predetermined angles with respect to the horizontal direction. Therefore, it is possible to cause the laser light to be incident on the light receiving element 7 with a predetermined diameter that is necessary for distance measurement, which may improve the measurement accuracy in distance measurement.

In the three-dimensional distance measuring apparatus 1, 1A, the lenses 23, 23, . . . may be disposed not to be inclined with respect to the horizontal direction.

In the above example, the light condensing lenses 11, 11, . . . are disposed in the vertical direction. However, the direction in which the light condensing lenses 11, 11, . . . are disposed should be determined in consideration of the splitting direction of the view angle so as to coincide with the splitting direction of the view angle. For example, if the splitting direction of the view angle is the horizontal direction, the light condensing lenses 11, 11, . . . are also disposed in the horizontal direction.

The splitting direction of the view angle is not limited to the vertical direction or the horizontal direction, and may be changed in accordance with the direction in which scanning is performed with laser light, to a desired direction orthogonal to the optical axis of the laser light.

In the above example, the three-dimensional distance measuring apparatus 1, 1A calculates a distance by measuring the round-trip period of laser light. However, the three-dimensional distance measuring apparatus 1, 1A may measure a distance by detecting the phase difference between emitted light and incident light.

The present application contains subject matter related to that disclosed in Japanese Priority Patent Application JP 2009-256053 filed in the Japan Patent Office on Nov. 9, 2009, the entire contents of which are hereby incorporated by reference.

Specific shapes and structures of respective components described in the above preferred embodiment are merely illustrative of an exemplary implementation of the present invention, and should not be construed as limiting the technical scope of the present invention.

What is claimed is:

1. A light directing system, comprising:
a light source;
a mirror positioned to redirect light emitted from the light source;
first and second relay lenses through which the redirected light from the mirror is passes, the first and second relay lenses being positioned at conjugate positions, the first relay lens being positioned between the second relay lens and the mirror, a focal length of the first relay lens being longer than a focal length of the second relay lens.

2. The light directing system of claim 1, wherein the mirror is rotatable about an axis.

3. The light directing system of claim 1, wherein the light source is a laser.

4. The light direction system of claim 1, wherein mirror is rotatable only with a limited range.

5. The light direction system of claim 1, further comprising a second mirror positioned to redirect light passed through the second relay lens.

6. The light direction system of claim 1, comprising another lens between the mirror and the light source.

7. The light direction system of claim 6, wherein the lens between the mirror and the light source is a collimator.

8. The light direction system of claim 1, wherein the mirror is a MEMS mirror.

9. The light direction system of claim 1, wherein each relay lens is a double-convex lens.

10. A light directing system, comprising:
a light source;
a mirror positioned to redirect light emitted from the light source;
first and second relay lenses through which the redirected light from the mirror is passes, the first and second relay lenses being positioned at conjugate positions, the first relay lens being positioned between the second relay lens and the mirror, a light condensing angle of the first relay lens closest to the mirror being smaller than a light condensing angle of the second relay lens.

11. The light directing system of claim 10, wherein a focal length of the first relay lens is longer than a focal length of the second relay lens.

12. The light directing system of claim 10, wherein the mirror is rotatable about an axis.

13. The light directing system of claim 10, wherein the light source is a laser.

14. The light direction system of claim 10, wherein mirror is rotatable only with a limited range.

15. The light direction system of claim 10, further comprising a second mirror positioned to redirect light passed through the second relay lens.

16. The light direction system of claim 10, comprising another lens between the mirror and the light source.

17. The light direction system of claim 16, wherein the lens between the mirror and the light source is a collimator.

18. The light direction system of claim 10, wherein the mirror is a MEMS mirror.

19. The light direction system of claim 10, wherein each relay lens is a double-convex lens.

20. A light direction system comprising:
a light source with a light beam that can be angled with respect to an optical axis; and
first and second relay lenses through which the light beam passes, the first and second relay lenses being positioned at conjugate positions along the optical axis, the first relay lens being positioned between the second relay lens and the light source, a focal length of the first relay lens being longer than a focal length of the second relay lens.

21. The light directing system of claim 20, wherein the light beam is a laser light beam.

22. The light directing system of claim 21, comprising a rotatable mirror between the light source and the first relay lens.

23. The light direction system of claim 20, wherein the light beam is restricted so as to be at an angle with respect to the optical axis within a limited range.

24. The light direction system of claim 20, wherein each relay lens is a double-convex lens.

* * * * *